Sept. 3, 1957     C. Z. MOELLER     2,805,277
ELECTRIC FENCE INSULATOR
Filed Jan. 21, 1953

INVENTOR.
CLIFFORD Z. MOELLER
BY
ATTORNEY.

United States Patent Office 2,805,277
Patented Sept. 3, 1957

2,805,277

ELECTRIC FENCE INSULATOR

Clifford Z. Moeller, West Springfield, Mass.; Leona N. Moeller, executrix of said Clifford Z. Moeller, deceased Application January 21, 1953, Serial No. 332,150

6 Claims. (Cl. 174—161)

This invention relates to electric wire fences and more particularly to an insulator for electrically separating the wire of the fence from the ground or from its ground connected support or post. A common type of electric fence is one that has a plurality of vertical posts which are spaced a few feet apart (while a distance of twelve or fifteen feet has been suggested it is not intended to confine the present invention to any specific spacing) the lower end of each of said posts being driven into and supported by the ground and the upper end of each of said posts serving as one of the supports for a bare wire extending from post to post and connected with one terminal of a suitable source of electric power of sufficient strength to cause a shock to cattle, horses, or other animals but of insufficient strength to cause any serious injury to the animal receiving the shock. The shock, it is to be understood, results from the animal standing on the ground which is connected with the other terminal of the source of electric power and moving sufficiently close to the fence to make contact with the bare wire which, as already stated, is connected to the first-named terminal of the source of electric power.

One of the objectionable features of electric fences of this general type is the manner in which the electric wire is supported by and at the same time is insulated from the fence posts. Generally speaking this double function of mechanical support and electrical insulation is provided by means of an insulator made of brittle material, such as porcelain, which is easily broken, and is often, if not usually, equipped with nuts and bolts or other metallic parts used for the necessary fastening. When one of these brittle insulators becomes broken the broken parts in pieces, drop to the ground and become a double hazard. Cattle or other animals are apt to take such parts into their stomach, along with grass or other food, and thereby injure themselves, so-called hardware poisoning. Furthermore farm machinery such as mowing machines, is apt to be injured or broken and in an effort to avoid such injury the machines are kept away from such areas close to the fence and consequently a certain fraction of the space beneath the fence is not utilized.

Broadly stated the present invention comprises a piece of pliable material that will hold the wire firmly to the post and can be assembled readily and very speedily.

One of the objects of the present invention is to provide a combined fence support and insulator formed of a material which is ductile, flexible, and elastic, and which has the resulting avoidance of the objections just described.

Another object of the invention is to provide an insulator which will by virtue of its elastic character be capable of holding fast both to the fence post and the fence wire.

A further object of the invention is to provide a device of the character described which will be capable of easy and rapid installation and will result in a saving of time and labor in its installation.

Another object of the invention is to provide an insulating and anchoring or supporting device which will be simple in construction, economical to manufacture, and easy and rapid to install.

The foregoing and other objects of the invention will readily appear to those skilled in the art to which it appertains by a consideration of the following description of one embodiment of the invention taken in connection with the accompanying drawings in which.

Figure 4:
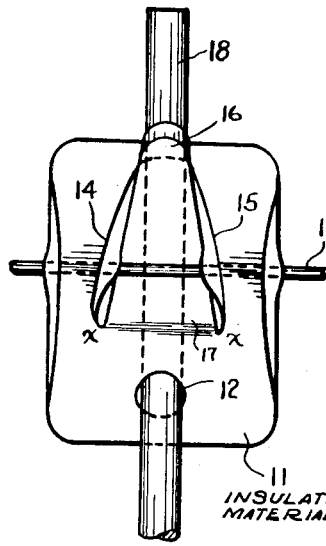
Fig. 4 is a front view of the parts of Fig. 3 in assembled position.

Referring to the drawings more in detail the reference character 11 indicates an insulating support formed of resilient material such as certain kinds of rubber or plastic material. This support is preferably rectangular in shape and is provided at one end with a cylindrical opening or aperture 12 for the reception of a fence post, as will be described later.

Figure 2:
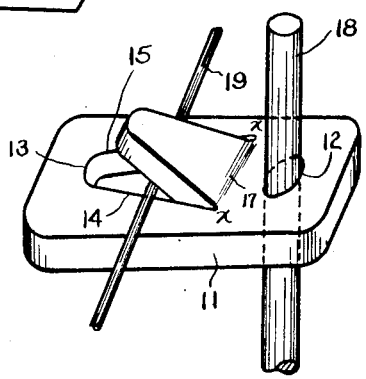
Fig. 2 is similar to Fig. 1 and shows the insulating support in its position relative to the other parts of the fence when they have been assembled.
Figure 3:
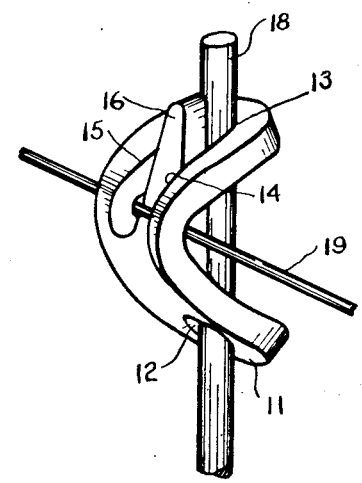
Fig. 3 is a perspective view of the support as it appears assembled with the tongue, loop, post and wire and with the tongue, loop, post, and wire in their final locking position.

At the other end there is also need for the provision of an aperture, which as herein illustrated, is accomplished by striking a tongue 16 from the insulating support. This tongue is defined by cuts 14, 15 and a hinge portion 17 extending generally along the line X—X. When the tongue is displaced from the support 11, an aperture 13 (Fig. 2) is provided for functional purposes set forth below. The cuts 14, 15 also permit relative displacement of the support material for the creation of transversely spaced apertures as best shown by Fig. 3.

Figure 5:
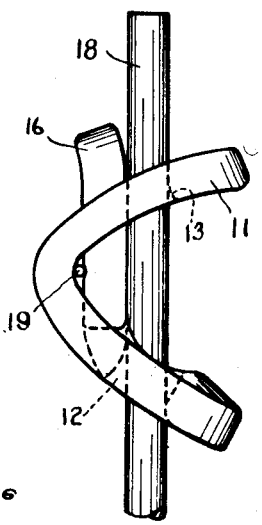
Fig. 5 is a side view of the parts of Fig. 3 in assembled position.
Figure 6:
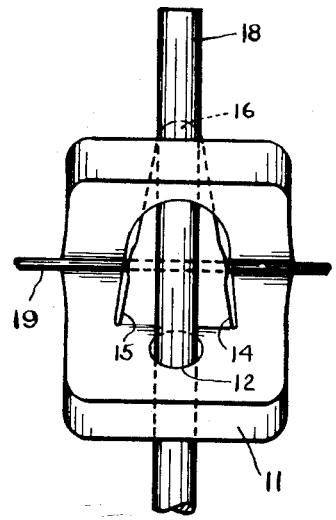
Fig. 6 is a rear view of the parts of Fig. 3 in assembled position.

A suitable fence post 18, which may be cylindrical in form as shown in the drawing, is positioned in the aperture 12 and the flexible support 11 is bent through an angle of approximately 180° so that the upper end of the fence post 18 passes through the aperture 12 and through the aperture 13 in the opposite direction, as may best be seen in Figs. 4, 5 and 6.

A completely assembled fence also requires two parts not yet fully described. One of these is the vertical fence post indicated by the reference character 18 which is shown in the drawing as a cylindrical rod. There is also a horizontally disposed electric wire 19.

Figure 1:
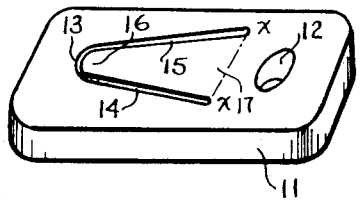
Fig. 1 represents an insulating support in its initial form prior to assembly with other parts.

The separate parts of the whole device have already been described as such and the following is a description of their assembly. The support 11 is held by the user in a horizontal position as shown in Figs. 1 and 2 and moved downward over the top of the post 18 so that the fence post 18 then extends above the insulator and also above the aperture 12. This is best seen in Fig. 2.

From the foregoing description it is more or less obvious that the shape of the support 11 and its resilient character introduces a clamping action between the support 11 and the fence post 18 which holds these parts in the position to which they have been adjusted. In addition to this desired result there is another advantage, namely, the location of the clamping action between the support 11 and the fence post 18 may be varied up and down to a considerable degree and very readily. This may be accomplished by pressing together the two ends of the support 11 and thereby loosening the clamping action and permitting the support 11 to slide up and down on the fence post 18 until at its new position the ends of the support 11 can be released at which time the support 11 again clamps against the fence post 18 whereby the support is held firmly in place. This is of considerable value when the fence is being strung over uneven ground and the different posts protrude above the ground different distances.

This adjustability is also of value when the fence is used for enclosing pasture land for animals of different height at different times. If the fence wire were at the proper height for a tall animal an animal not so tall can readily walk under the fence without touching the wire or receiving any shock to deter him from crossing the fence.

I claim:

1. An insulator for supporting the wire of an electric fence on a post of said fence comprising a body member of resilient flexible material provided with oppositely spaced apertures adjacent each end thereof when bent in U-shape to receive the post and position the intermediate portion of said body on one side thereof, said intermediate portion having a central section between marginal edge sections thereof, said central section being relatively movable to provide transversely spaced openings for receiving an electrically charged fence wire.

2. An insulator construction according to claim 1 in which the central section of said intermediate portion is in the form of a longitudinally extending tongue and said transversely spaced openings are formed by slits defining the lateral edges of said tongue between said outer edge sections of said intermediate portion.

3. The structure of claim 2 in which the transversely spaced slits defining the lateral edges of said tongue member at the intermediate portion of the body extend toward one end of said body in converging relationship and are connected at said end to form one of said post receiving apertures.

4. The structure of claim 3 in which said tongue member terminates in a free end portion filling the aperture formed by the connecting ends of said slits when said body member is in flattened form.

5. An insulator for supporting the wire of an electric fence on a post of said fence comprising a strip of resilient insulating material having adjacent one end thereof a first aperture for receiving a fence post therethrough, an elongated second aperture formed at the opposite end of the strip having at its inner end a tongue of insulating material projecting therefrom, said second aperture receiving at its outer end a fence post in spaced relation to said first aperture with the intermediate portion of said strip disposed at one side of the post and folded transversely of said second aperture adjacent the inner end thereof, said tongue in post engaging position of said strip having one face engageable against said post to receive an electrically charged fence wire against the other face thereof and with the adjacent wire sections nested laterally of the tongue in the transverse folded portions of said strip.

6. An insulator for mounting the wire of an electric fence on a post of said fence comprising a strip of resilient material having an aperture at one end thereof, an elongated aperture extending from the opposite end of the strip and across a fold line of said strip defined by a midline between the outermost edges of said apertures, the outer end of said elongated aperture receiving a fence post passing through the first aperture in folded condition of said strip, and a tongue integral with the body of said strip extending from the inner end of said elongated opening engageable against a fence post between said openings inwardly of the inner folded portions of the folded strip whereby a fence wire may be mounted against said tongue and be nested in the folds of said strip for the support of the wire at said fold line.

References Cited in the file of this patent

UNITED STATES PATENTS

| | | |
|---|---|---|
| 606,461 | Johnson | June 28, 1898 |
| 2,292,140 | Lofgren | Aug. 4, 1942 |
| 2,429,857 | Verner | Oct. 28, 1947 |
| 2,502,882 | Perkins | Apr. 4, 1950 |
| 2,527,442 | Odegaard | Oct. 24, 1950 |